United States Patent

[11] 3,604,277

[72] Inventors William W. Stripling;
David L. Jones, both of Huntsville, Ala.
[21] Appl. No. 11,990
[22] Filed Feb. 17, 1970
[45] Patented Sept. 14, 1971
[73] Assignee The United States of America as represented by the Secretary of the Army

[54] SINGLE JET PNEUMATIC PULSE DURATION MODULATION GYRO
4 Claims, 6 Drawing Figs.

[52] U.S. Cl. .................................................. 74/5.12,
74/5.6, 74/5.7
[51] Int. Cl. .................................................. G01c 19/26,
G01c 19/28
[50] Field of Search .................................................. 74/5.
5.7, 5.6, 5.12, 5.43; 308/9, DIG. 1

[56] References Cited
UNITED STATES PATENTS

| | | | |
|---|---|---|---|
| 3,115,784 | 12/1963 | Parker | 74/5.7 X |
| 3,187,588 | 6/1965 | Parker | 74/5.6 X |
| 3,276,270 | 10/1966 | Speen | 74/5.7 X |
| 3,320,816 | 5/1967 | Johnston | 74/5.6 |
| 3,358,514 | 12/1967 | Hauf | 74/5.7 |
| 3,416,378 | 12/1968 | Evans et al. | 74/5.43 X |
| 3,501,967 | 3/1970 | De Cotiis | 74/5.6 |

Primary Examiner—Manuel A. Antonakas
Attorneys—Harry M. Saragovitz, Edward J. Kelly, Herbert Berl and Harold W. Hilton ABSTRACT: A two axis all pneumatic displacement gyroscope that detects a change of position in pitch and jaw of a missile. The spin axis of the gyro rotor is directed along the longitudinal axis of the missile. The rotor utilizes a hydrostatic air bearing and the gyro pickoff responds to the exhaust from the air bearing. A single air jet provides the rotor exhaust for the pickoff collectors. To provide the air bearing, a gas is introduced into a plenum chamber within the stator about which the rotor spins. The gas is uniformly passed through output passages of the plenum chamber, exiting at the spherical surface of the stator. The inner spherical surface of the rotor is supported by the exhausting gas. In exhausting from the air bearing, the gas passes through a single passage in the rotor that terminates on the surface of the rotor. The single output gas stream periodically impinges on pickoff devices arranged around the circumference of the rotor. The relative position of the pickoffs, with respect to the rotating output jet, controls the period that the gas is accepted by the pickoff. When the rotor and stator are changed in reference to each other, as when a missile changes position or direction, the air jet makes a varying path as it passes across the pickoffs. With variations in pitch and jaw, the period that gas impinges on the pickoffs is also varied, thus providing an output signal in response to the direction of change in trajectory.

PATENTED SEP 14 1971

3,604,277

William W. Stripling
David L. Jones,
INVENTORS
BY

3,604,277

SINGLE JET PNEUMATIC PULSE DURATION MODULATION GYRO

BACKGROUND OF THE INVENTION

A directional gyro is a 2-degree-of-freedom gyro having a stabilized reference in space. A rotating mass or rotor spins around a stator with the rotor spin axis being the stabilized reference. The stator is fixed to support structure and relative motion of the support structure along quadrature axes normal to the spin axis does not disturb the direction of the spin axis. In a missile system the gyro stabilized reference axis is along the longitudinal axis of the missile for directional control and responds to attitude changes of the missile. Pickoffs measure rotation of the support structure with respect to the rotor, detecting changes in the missile trajectory and coupling these changes to directional control systems. Control systems such as movable fins or gas jet exhausts return the missile to the desired trajectory.

In pickoffs that respond to air jets an air supply is normally directed toward the pickoff collector and is deflected by the spinning gyroscope rotor or is cut on and off by the rotor in proportion to the stator changes of relative position. If an air bearing is also employed between the stator and the rotor a uniform input flow or pressure must be supplied to support the rotor. Hence, a separate source is provided for air bearings since a gated or deflected gas pickoff system allows and causes fluctuations in supply pressure therefor. Additional pickoff methods include optical detection wherein an optical signal is reflected from reflective areas of a spinning rotor to contact the optical pickoff. Directional changes of the missile results in a change of direction of the reflected light beam which is sensed by the optical detector.

SUMMARY OF THE INVENTION

The apparatus of the present invention is a gyroscope for providing pitch and yaw control of a missile. A free rotor has the spin axis thereof aligned with the missile longitudinal axis. The gyro is brought up to speed and is uncaged at missile launch. The missile trajectory is maintained along the rotor spin axis, normal to the plane of the rotor. A stator is enclosed by the rotor and contains a plenum chamber therein for receiving exhaust gas therein. The gas is uniformly distributed to the surface of the stator through a plurality of plenum chamber output passages. Gas is thus directed to the outer surface of the stator and forms a hydrostatic air bearing for the spherical inner surface of the rotor.

A rotor hydrostatic bearing air serves as the source of air for the gyro pickoffs. In exhausting from the air bearing area, the gas is forced through a single passage in the rotor that terminates at the surface of the rotor, providing a single jet of exhaust gas. This exhaust or output gas stream impinges on pickoffs spaced in a plane around the circumference of the rotor at the equator thereof. The output gas impinges equally on the pickoffs when no input rate is encountered. However, when the rotor and stator are changed in reference to each other, the stator being fixed to the missile, the airjet makes a varying path as it passes across the pickoffs. Variations in pitch and yaw of a missile varies the time period that exhaust gas is received by the pickoffs, providing an output signal from the pickoffs that is proportional to the magnitude of changes in trajectory. Outputs from the individual pickoffs are representative of the direction of change in trajectory. The output pulse duration modulation signal from the pickoffs can be coupled to a bistable flueric amplifier for correcting flight errors by exhausting gas to the missile surface.

An object of the present invention is to provide a gyro having a single air source for a rotor air bearing and for a single jet, rotor exhaust to pickoffs.

Another object of the present invention is to provide a single jet gyro having the exhaust air therefor provided from the hydrostatic air bearing chamber.

DESCRIPTION OF THE PREFERRED EMBODIMENT

Figure 2:
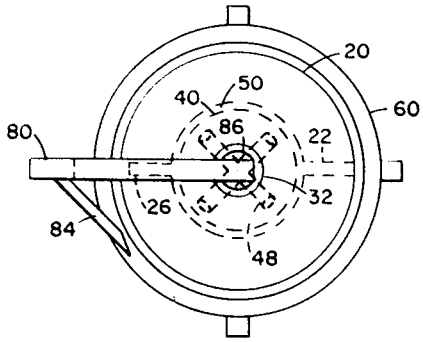
FIG. 2 is a plan view of the rotor of FIG. 1.
Figure 1:
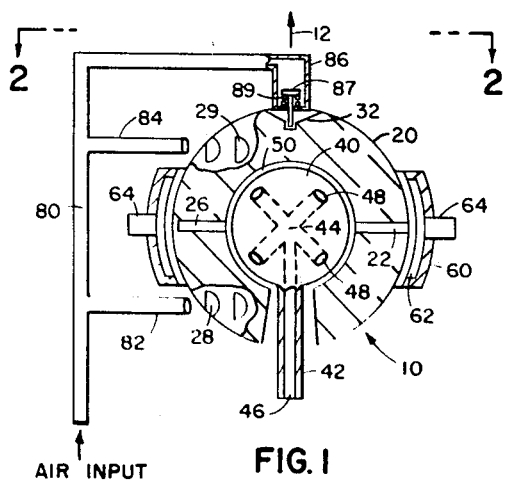
FIG. 1 is an elevational view of a preferred embodiment of the invention shown partially in section.

Referring now to the drawings wherein like numerals represent like parts in all figures, a preferred embodiment is disclosed in FIG. 1. A single jet, pulse duration modulation (PDM) gyro 10 includes a rotor structure 20, a stator structure 40 and pickoff housing structure 60. Rotor 20 encompasses and is supported by stator 40. Stator 40 is fixed to missile support structure through a shaft 42. A plenum chamber 44 within stator 40 has an input passage 46 thereto passing through shaft 42. As also shown in FIG. 2, at least eight output passages 48 radiate from plenum chamber 44 to the spherical surface of stator 40. Gas is conveyed from plenum chamber 44 through passages 48 to the surface of stator 40 for forming a hydrostatic air bearing 50 in the chamber or region between the outer surface of stator 40 and the inner surface of rotor 20. For eight output passages 48, the passages form four intersecting axes having two passages per axis, with the axes intersecting at the center of the plenum chamber.

Rotor 20 has an air passage 22 connecting the inner surface thereof to the outer surface. Air passage 22 is substantially in the plane of the rotor equator, normal to the spin axis 12 of the rotor. Gas exhausting from hydrostatic air bearing 50 passes through passage 22 to the surface of rotor 20 exiting as an air jet therefrom. A restricted hole 26 in rotor 20 is coaxially aligned with the longitudinal axis of air passage 22 in the plane of the rotor equator. Restricted hole 26, being opposite passageway 22, provides balance for rotor 20. Some exhaust gas from bearing 50 also exits around stator shaft 42. Changes between rotor 20 and stator 40 are corrected at the beginning of a change in relative position, allowing only relatively small changes in rotor-stator relative position and preventing frictional contact between shaft 42 and rotor 20.

Rotor spin-up and caging can be provided by electrical, mechanical or pneumatic means. As shown in FIGS. 1 and 2, air or gas is supplied through a passageway forming member 80 for spin-up and caging. Nozzles 82 and 84 connect to passageway member 80 and exhausts air tangentially to the surface of rotor 20. First and second series of air buckets 28 and 29 are around the periphery of rotor 20 and pass adjacent to nozzles 82 and 84, respectfully, during rotation. The nozzle exhaust air impinging on the air buckets brings rotor 20 up to speed. Passageway forming member 80 has an end member 86 terminating adjacent rotor 20 along the spin axis thereof. Member 86 has an air piston 87 protruding from the end thereof which projects into a hole 32 in rotor 20. Hole 32 is symmetrical about the spin axis 12. Spring 89 provides bias between piston 87 and the distal end of member 86. Thus, when air pressure is supplied to member 80, spring 89 is compressed and piston 87 is forced into hole 32, caging the rotor. Air exhausts around the piston and impinges on the sloping hole surface area, centering the piston and preventing contact between rotor and piston during spin-up. When air is removed from passageway 80, piston 87 is retracted by spring 89, uncaging the gyro.

Figure 3:
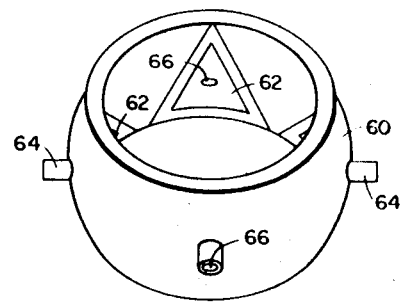
FIG. 3 is a view of the rotor housing and pickoff arrangement.
Figure 4:
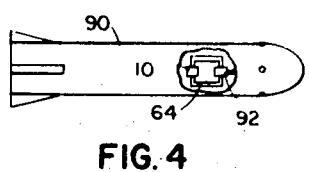
FIG. 4 is a view of a missile incorporating the invention therein.

Air exhausting from bearing 50 passes through air passage 22 providing an air jet output that impinges on the inner surface of pickoff housing 60. As shown in FIG. 3, housing 60 includes four evenly spaced pickoff collectors 62. Tubular passageway forming members 64 terminate at collectors 62 providing an air passage 66 therefrom. Pickoff collectors 62 are triangular pockets or sections formed in the inner surface of housing 60. Tubular output passages 64 are connected to missile directional controlling apparatus as shown in FIG. 4. Typically, in a missile 90, gyro 10 has output passages 64 connected to a bistable flueric amplifier 92. Opposing output passages 64 connect to one amplifier 92 for controlling pitch, while the other opposing output passages 64 connect to another amplifier 92 for controlling yaw.

Figure 5:
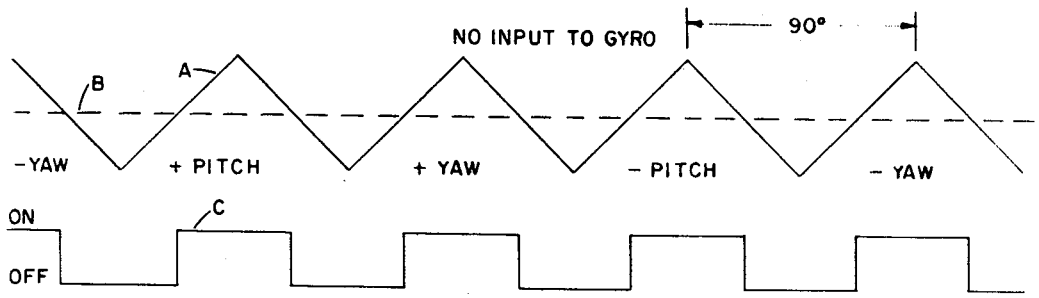
FIG. 5 is a diagrammatic expansion of the pickoffs showing a uniform pickoff input signal.
Figure 6:
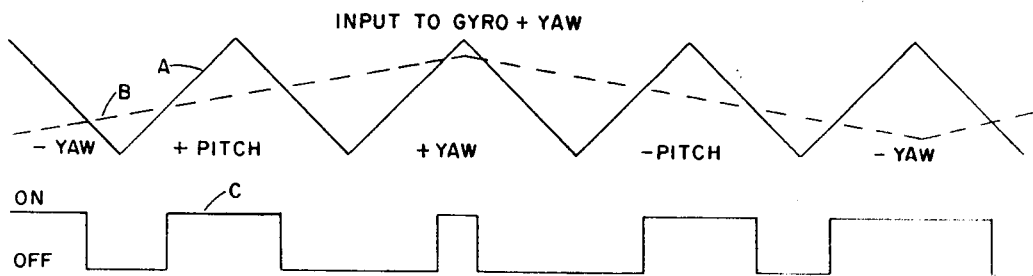
FIG. 6 is a diagrammatic linear expansion of the pickoffs showing a nonuniform pickoff input signal.

Prior to missile launch and during spin-up, gas or air is introduced into input passageway 80 and in passage 46. Air pressure introduced in passage 46 passes into plenum chamber 44 where it is uniformly distributed through passages 48 to provide hydrostatic air bearing 50. After spin-up the rotor is uncaged by retraction of piston 87 from hole 32. Rotor 20 is then free in space with the spin axis aligned with the missile longitudinal axis to provide pitch and yaw control. Pickoffs 62, arranged along the pitch and yaw axes, sense attitude deviation of the missile (support structure) with respect to the rotor, and deflect an air jet through passages 66 to controlling devices. FIGS. 5 and 6 show the pickoff response that is coupled out of housing 60. The air jet exhausting from rotor passage 22 makes a path on pickoff collector 62 as the rotor spins. The area beneath Curve A is representative of the pickoff receptor areas with the distance between adjacent apexes being equal to a 90° rotation of the rotor. Curve B represents the path of air flow exhausting from passage 22. Curve C is the time period that air is coupled through pickoffs 62 and output passages 66 to indicating or using circuitry, as flueric amplifiers 92. The output pulses, Curve C, of FIG. 5 are identical for each pickoff, indicating either a caged condition or alignment of the spin axis with the missile longitudinal axis. There is no input deviation to the gyro. Curve C of FIG. 6 indicates an input in the direction of (+) yaw with very little air coupled out of the associated pickoff. The pitch axis shows no change because of the diagonal flow of air thereacross and the corrective output air jet is coupled out of the (−) yaw pickoff to bring the missile back on trajectory. The output PDM wave from each pickoff has a wave period equal to the time that air is exhausted on the pickoff from passage 22.

Thus an ON-OFF control system is provided, yielding a constant output air jet rate for a variable time. The gas exhausting from hydrostatic air bearing 50 escapes primarily through air passage 22 to impinge on pickoffs 62. Only one air jet serves as a pickoff air source and the air bearing and pickoff air are from the same source supplying input passage 46. Obviously the flueric amplifiers can be at either the fore or the aft end of a missile for stabilizing the missile along a flight path. In shifting an aft control to the front of a missile it is only necessary to reverse opposing exhaust ports.

We claim:

1. A single jet, pneumatic displacement gyro comprising: a gyroscope stator; a rotor disposed for rotation about said stator; a plenum chamber within said stator having an input passageway and a plurality of output passageways for conveying air or gas therethrough, said output passages terminating at the outer spherical surface of said stator; said rotor having an inner spherical surface adjacent the outer surface of said stator providing a chamber therebetween wherein a hydrostatic air bearing is formed in response to gas exhausting from said stator output passages; said rotor having a single air passage connecting said inner surface to the outer surface thereof for exhausting said hydrostatic bearing gas to the outer rotor surface; said rotor having a restricted hole opposite the air jet passage and coaxial therewith to balance said rotor, said restricted hole projecting from the inner surface of said rotor toward the outer surface and terminating before reaching the outer rotor surface; caging means adjacent said rotor for controlling the spin axis direction of said rotor and pickoff means adjacent said rotor for receiving gas exhausted from said rotor air passage, said pickoff means having a spherical sleeve housing, a plurality of triangular sections or pockets evenly spaced within said housing, and a plurality of cylindrical tubular passageway forming members each having one end thereof connected near the center of said triangular sections and projecting through said housing and the outer surface thereof for collecting exhaust gas from said rotor air passage; and said rotor single air passage and restricted hole lying in a plane normal to the rotor spin axis substantially along the equator of said rotor.

2. A single jet displacement gyro as set forth in claim 1 wherein said plurality of triangular sections and passageway forming members comprise at least four pickoffs.

3. A single jet displacement gyro as set forth in claim 2 wherein said caging means comprises a passageway forming member for conveying gas therethrough and terminating with the distal end thereof adjacent said rotor and coaxial with the spin axis of said rotor, a tapered notch in said rotor adjacent the distal end of said passageway forming member, and a spring loaded piston in the distal end of said passageway forming member for projecting into said rotor notch when gas pressure is supplied though said passageway forming member.

4. A single jet displacement gyro as set forth in claim 3 further comprising first and second series of air buckets uniformly spaced around the periphery of the rotor and spaced an equal distance on opposite sides of the rotor equator, first and second spin-up nozzles aligned respectively with said buckets and fixed to said caging passageway forming member for conveying gas to said buckets for spinning-up said rotor.